United States Patent [19]

Schuck

[11] Patent Number: 4,503,945
[45] Date of Patent: Mar. 12, 1985

[54] FAILSAFE BRAKE ACTUATING ASSEMBLY

[75] Inventor: Paul R. Schuck, Davenport, Iowa

[73] Assignee: J. I. Case Company, Racine, Wis.

[21] Appl. No.: 519,000

[22] Filed: Aug. 1, 1983

[51] Int. Cl.³ ............................................. F16D 65/58
[52] U.S. Cl. ..................................... 188/71.8; 74/470; 188/196 BA; 192/8 R
[58] Field of Search ..................... 188/71.8, 71.9, 72.9, 188/196 B, 196 BA, 196 F, 170, 151 A; 403/111, 146; 74/470, 411; 192/8 R, 1, 3 R, 91 R

[56] References Cited

U.S. PATENT DOCUMENTS 2,115,849  5/1938  Gustavson ............................. 74/470
3,482,661 12/1969  Meier ................................. 188/196 F Primary Examiner—Bruce H. Stoner, Jr.
Assistant Examiner—Michael P. Gilday
Attorney, Agent, or Firm—Cullen, Sloman, Cantor, Grauer, Scott & Rutherford

[57] ABSTRACT

A failsafe brake actuating assembly for crawler-type tractors which automatically engages a braking device in situations where there is a loss of engine power or the like with resulting incapacitation of the tractor's primary braking system. The brake actuating assembly includes a brake actuating cylinder connected to a brake actuating arm for rotating the arm in opposite directions. The assembly further includes an adjustment member having a first bearing support for rotatably mounting the brake actuating arm and a plurality of peripheral teeth members. The actuating arm includes a second bearing support, the axis of which is eccentric to the axis of the first bearing support. A torsion spring connecting link is mounted on the second bearing support with one end of the connecting link attached to the actuating arm and the other end of the connecting link engaging the teeth of the adjustment member. The tension between the ends of the spring connecting link increases in response to rotation of the actuating arm in a first direction due to the eccentricity between the axes of the first and second bearing supports. Rotation of the actuating arm in an opposite direction generates a small clearance gap between the end of the spring connecting link and the adjustment member teeth. This clearance gap tends to increase as internal brake wear occurs and eventually the end of the spring connecting link slips on the adjustment member teeth thereby adjusting the mechanism for wear.

1 Claim, 2 Drawing Figures

FAILSAFE BRAKE ACTUATING ASSEMBLY

BACKGROUND OF THE INVENTION

The present invention relates to a failsafe brake actuating assembly for crawler-type tractors which automatically engages a braking device in situations such as where there is a loss of engine power and resulting incapacitation of the tractor's primary braking system.

The prior art includes several structures relating to hydraulic-type brakes for vehicles. These prior art brake units include a source of hydraulic pressure acting against brake members which are displaced and held in a braking position in response to the hydraulic pressure applied thereto. Further, the prior art is aware of failsafe hydraulic-type brakes which also employ springs for actuating the brake members when hydraulic pressure is not available. These failsafe brakes provide for automatic brake application in the absence of hydraulic pressure in the machine's primary braking system.

Accordingly, it is an object of the present invention to provide an improved failsafe brake actuating assembly which performs more functions and is more efficient in operation than the devices of the prior art.

SUMMARY OF THE INVENTION

The failsafe brake actuating assembly of the present invention is particularly useful in connection with the conventional transmission brakes on a crawler tractor which include a housing enclosing disc-type brake members. Each set of brake members is mounted on a brake disc hub that is connected to one end of a transmission shaft. Axial force on the brake members from a piston member will bring the brake members into face-to-face contact with each other thereby stopping the rotation of the transmission shaft. As is also conventional, the piston member is moved axially toward the brake members by a brake actuating cam. Thus, rotation of the brake actuating cam causes a corresponding axial movement of the piston member against the brake members for moving them into face-to-face contact for braking.

The failsafe brake actuating assembly includes a brake actuator cylinder which is connected to at least one brake actuating arm for rotating the actuating arm in opposite directions. The actuating cylinder is connected to a source of fluid pressure, such as the transmission lubrication system, and includes a piston which is movable in a first direction against a compression spring in response to the presence of fluid pressure from the source. Alternatively, the piston is movable in an opposite direction by the expansion of the compression spring when there is no fluid pressure from the source.

If fluid pressure is transmitted to the actuating cylinder, the piston compresses the spring thereby positioning the actuating arm such that the brake actuating cam does not cause axial movement of the brake piston member into engagement with the disc brake members. However, if there is a sudden loss of fluid pressure arising from a loss of engine power or the like, the actuating cylinder compression spring expands against the actuating cylinder piston thereby repositioning the brake arm which results in the rotation of the brake actuating cam for causing the brake piston member to move axially against the disc brake members.

The brake actuating assembly further includes an adjustment member which is directly connected to the rotatable brake cam for operating the transmission brakes. The adjustment member includes a first bearing support for rotatably mounting the brake actuating arm thereby permitting the actuating arm to rotate relative to the adjustment member. The axis of rotation for the actuating arm on the first bearing support is colinear with the axis of rotation of the brake cam. Finally, the adjustment member includes a plurality of peripheral teeth members for a purpose to be explained.

The brake actuating arm includes a second bearing support, the axis of which is eccentric to the axis of the first bearing support. A torsion spring connecting link is mounted on the second bearing support with one end of the connecting link being attached to the brake actuating arm and the other end of the connecting link engaging the teeth on the adjustment member. Thus, the spring connecting link completes the connection between the brake actuating cylinder and the brake actuating cam whereby movement of the actuating cylinder results in rotation of the brake actuating cam for causing application of the tractor mechanical brakes.

The movement of the brake actuating arm in a direction to apply the mechanical brakes tends to increase the tension between the ends of the torsion spring connecting link due to the eccentricity between the axes of the brake actuating cam and second bearing support. Rotation of the brake actuating arm in the opposite direction for disengaging the mechanical brakes tends to generate a clearance gap between the end of the spring connecting link and the teeth on the adjustment member. This clearance gap tends to increase slightly over time as internal brake wear takes place. The increasing clearance gap eventually becomes large enough for the end of the spring connecting link to slip into the next tooth on the adjustment member thereby adjusting the mechanism in response to wear in the mechanical brakes.

Other advantages and meritorious features of the failsafe brake actuating assembly of the present invention will be more fully understood from the following description of the invention, the appended claims, and the drawings, a brief description of which follows.

DETAILED DESCRIPTION OF THE INVENTION

Figure 1:
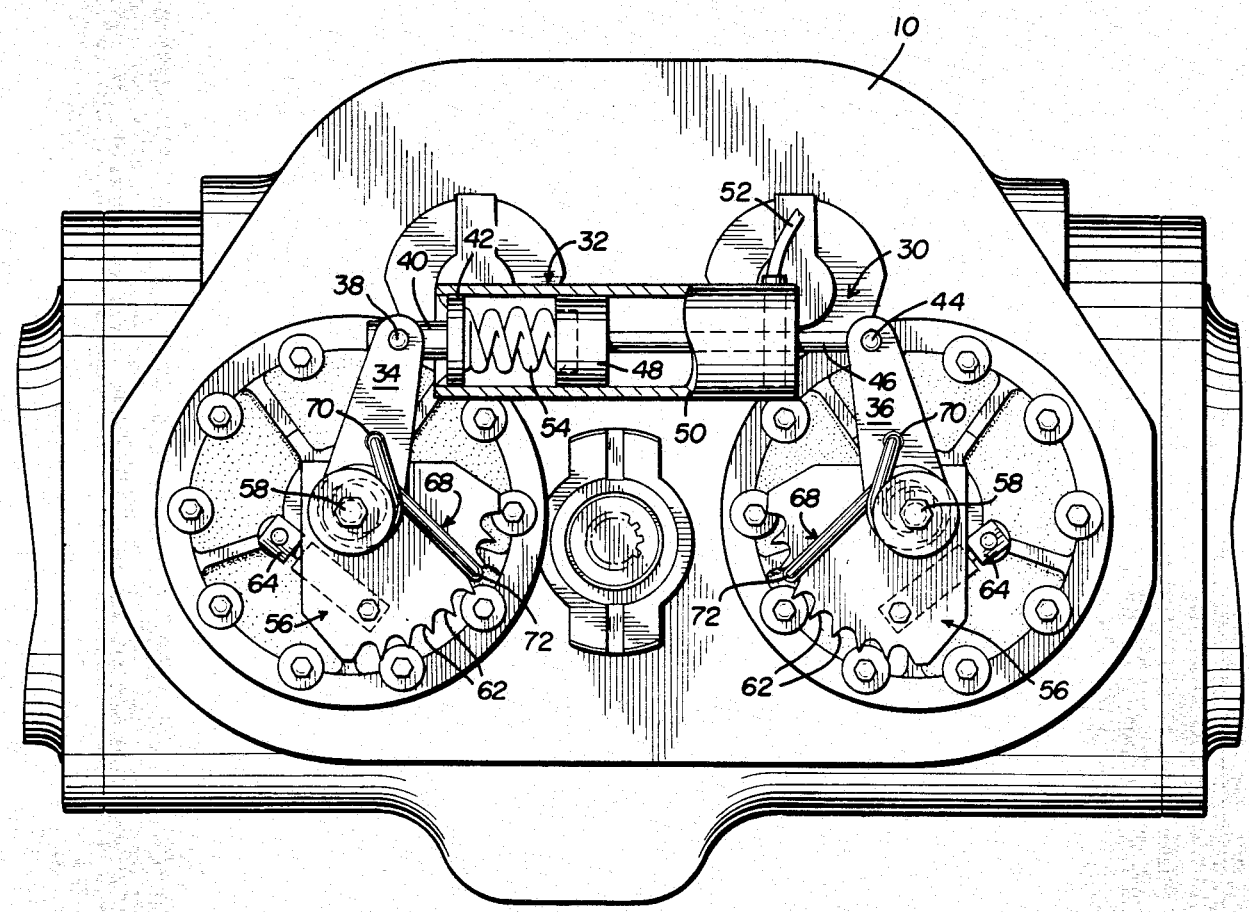
FIG. 1 is a front view, partly in cross-section, of the failsafe brake actuating assembly connected to the conventional transmission brakes on a crawler tractor.
Figure 2:
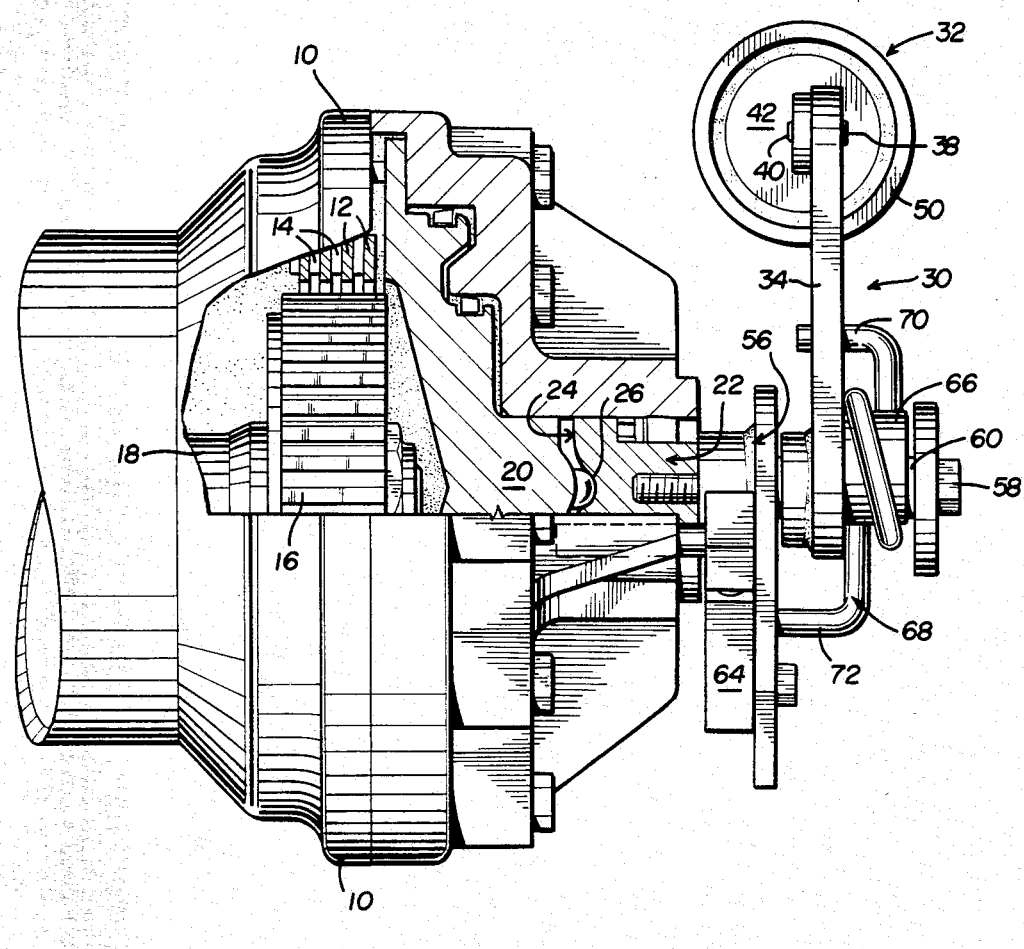
FIG. 2 is a side elevational view of the brake actuating assembly with part of the transmission brake housing cut away for easier viewing.

The preferred embodiment of the failsafe brake actuating assembly for crawler-type tractors is illustrated in FIGS. 1 and 2. The present invention is particularly useful in connection with the conventional transmission brakes on a crawler tractor. As illustrated in FIGS. 1 and 2, a housing 10 encloses two sets of conventional disc-type brake members 12 and 14. Each set of brake members 12 and 14 is mounted on a brake disc hub 16 that is connected to one end of a transmission shaft 18. Axial force on each set of brake members 12 and 14 from a respective piston member 20 will bring brake members 12 and 14 into face-to-face contact with each other thereby stopping the rotation of the corresponding transmission shaft 18.

As is also conventional, each piston member 20 is moved axially toward a corresponding set of brake members 12 and 14 by a brake actuating cam 22. Cam 22 includes a cam ramp surface 24 with a steel ball 26 interposed between cam surface 24 and piston member 20. Thus, rotation of either brake actuating cam 22 causes a corresponding piston member 20 to move axially against a set of brake members 12 and 14 for moving them into face-to-face contact. The structure within housing 10 is substantially of a conventional arrangement with the remainder of the structure illustrated in FIGS. 1 and 2 pertaining to the present invention.

The failsafe brake actuating assembly 30 of the present invention includes a brake actuator cylinder 32 which is connected between a pair of brake actuating arms 34 and 36. Arm 34 is pivotally connected by pin 38 to a stub shaft 40 that extends from cylinder end cap 42. On the other end of cylinder 32, brake actuating arm 36 is pivotally connected by pin 44 to piston rod 46. Piston 48 is movable within cylindrical housing 50 in a first direction in response to fluid pressure transmitted through conduit 52 into housing 50. Alternatively, piston 48 is movable in an opposite direction by the expansion of compression spring 54 when there is no fluid pressure through conduit 52.

Conduit 52 is connected to a source of fluid pressure such as the transmission lubrication system. If fluid pressure exists in conduit 52, piston 48 compresses spring 54 thereby positioning brake arms 34 and 36 such that the brake actuating cams 22 do not cause axial movement of piston members 20 into engagement with brake members 12 and 14. However, if there is a sudden loss of fluid pressure arising from a loss of engine power or the like, then spring 54 expands against piston 48 thereby repositioning brake arms 34 and 36 which results in the rotation of brake actuating cams 22 for causing piston members 20 to move axially against brake members 12 and 14.

The brake actuating assembly 30 further includes adjustment plates 56 which are individually attached to a corresponding brake actuating cam 22 by a fastener 58 as shown in FIG. 2. Each adjustment plate includes a cylindrical bearing support 60 attached to it such that the axis of bearing support 60 is also the axis of rotation of the brake actuating cam 22. Thus, the brake arms 34 and 36 are free to rotate relative to the adjustment plates 56. As shown in FIG. 1, each adjustment plate 56 also includes a plurality of teeth 62 for a purpose to be explained. Finally, conventional automatic wear adjusters 64 are connected between adjustment plates 56 and housing 10.

Each brake actuating arm 34 and 36 is provided with a short cylindrical shaft 66 (FIG. 2), the axis of which is offset relative to the common rotational axis of the brake actuating cam 22 and corresponding brake actuating arm. Thus, the axis of shaft 66 describes an eccentric arc about the axis of the brake actuating cam 22 as its corresponding brake actuating arm is rotated. Each eccentric shaft 66 provides a close fit support for a torsion spring connecting link 68. One end 70 of each torsion spring connecting link 68 fits into an opening in a corresponding brake arm 34 or 36 and the other end 72 is captured between tooth projections 62 on an adjustment plate 56.

Thus, the spring-like links 68 complete the connection between the brake actuating cylinder 32 and the brake actuating cams 22 whereby movement of the end points 38 and 44 of cylinder 32 results in rotation of the brake actuating cams 22 for causing application of the tractor mechanical brakes.

The movement of the brake actuating arms 34 and 36 in a direction (clockwise) to apply the brakes tends to increase the tension between the ends 70 and 72 of torsion spring connecting links 68 due to the eccentricity between the axes of the brake actuating cams 22 and shafts 66. Rotation of the actuating arms 34 and 36 in the opposite direction for disengaging the brakes tends to generate a clearance gap between the ends 72 of spring connecting links 68 and adjustment plate teeth 62.

The positioning of the adjustment plates 56 when the brakes are disengaged varies over time depending upon the internal wear of the brake components and the resulting movement in the conventional automatic wear adjusters 64. This means that the clearance gap generated between the ends 72 of spring links 68 and adjustment plate teeth 62 tends to increase slightly as internal brake wear takes place. This increase in clearance gap eventually becomes large enough for the ends 72 of springs 68 to slip into the space between the next pair of teeth 62 thereby adjusting the mechanism for wear.

It will be apparent to those skilled in the art that the foregoing disclosure is exemplary in nature rather than limiting, the invention being limited only by the appended claims.

What is claimed is:

1. A brake actuating assembly for the transmission brakes of a crawler-type tractor, said assembly including:

a brake actuating cylinder pivotally connected to one end of a brake actuating arm for rotating said actuating arm in opposite directions, said actuating cylinder connected to a source of fluid pressure and including a piston which is movable in a first direction against a spring means in response to the presence of fluid pressure from said source, and said piston movable by said spring means in a second opposite direction in response to the absence of fluid pressure from said source;

an adjustment member connected to a rotatable brake cam for operating said transmission brakes, said adjustment member including a first bearing support for rotatably mounting said brake actuating arm thereby permitting said actuating arm to rotate freely relative to said adjustment member, said brake cam being rotatable about an axis that is colinear with the axis of said first bearing support, and said adjustment member including a plurality of peripheral teeth members;

said actuating arm including a second bearing support, the axis of which being eccentric to the axis of said first bearing support, a torsion spring connecting link mounted on said second bearing support with one end of said connecting link connected to said actuating arm and the other end of said connecting link engaging said teeth members; and rotation of said actuating arm in said second direction increasing the tension between the ends of said spring connecting link due to the eccentricity between the axes of said first and second bearing supports, and rotation of said actuating arm in said first direction generating a small clearance gap between said other end of said spring connecting link and said teeth members for wear adjustment.

* * * * *